United States Patent [19]

Yin

[11] Patent Number: 4,800,460
[45] Date of Patent: Jan. 24, 1989

[54] ELECTRICAL POWER PROTECTION TECHNIQUE

[75] Inventor: Simon Yin, Fremont, Calif.

[73] Assignee: Square D Company, Palatine, Ill.

[21] Appl. No.: 95,346

[22] Filed: Sep. 10, 1987

[51] Int. Cl.⁴ .............................................. H02B 1/04
[52] U.S. Cl. ............................... 361/340; 200/50 AA; 361/347; 361/360; 361/391
[58] Field of Search ................................... 200/50 AA; 361/336–339, 342, 344, 345, 347, 349, 357, 359–360, 391

[56] References Cited

U.S. PATENT DOCUMENTS

| | | | |
|---|---|---|---|
| 2,795,739 | 6/1957 | Wood | 200/50 AA |
| 2,914,627 | 11/1959 | Eichelberger et al. | 200/50 AA |
| 3,676,749 | 7/1972 | Wilson et al. | 361/343 |
| 3,749,862 | 7/1973 | Wilson et al. | 200/50 AA |
| 3,790,861 | 2/1974 | Sakats | 200/50 AA |

*Primary Examiner*—Philip H. Leung
*Assistant Examiner*—Gregory D. Thompson

*Attorney, Agent, or Firm*—Flehr, Hohbach, Test, Albritton & Herbert

[57] ABSTRACT

An electrical power protection technique which is especially suitable for use in three-phase high voltage switch gear applications is disclosed herein. This technique utilizes an electrically insulated housing for each phase of the electrical circuit. Each housing contains a fuse intended for placement in circuit with the switch gear and a source of high voltage and has an entry door for gaining access to the fuse from outside the housing. Each fuse is disengagably connected to a power terminal, outside the housing through a utility opening in the latter. The terminal is, in turn, connected in circuit with the source of high voltage and switch gear. A component interlock assembly is provided for automatically disconnecting each fuse from its terminal and thereafter closing the cooperating utility opening sufficient to physically shield the terminal from its fuse when the entry door is opened. The same interlock assembly automatically opens each utility opening and reconnects its associated fuse with its cooperating terminal when the entry door of its housing is closed.

11 Claims, 3 Drawing Sheets

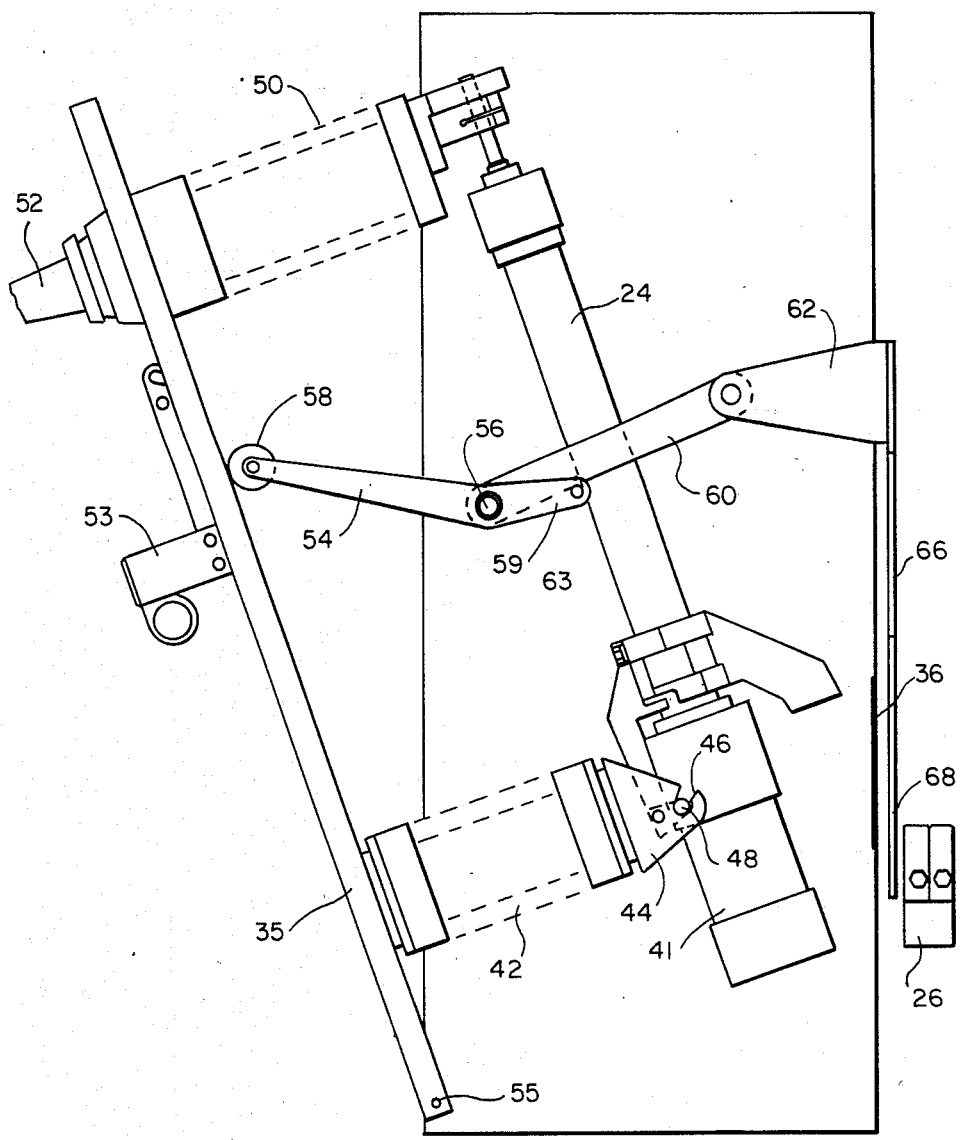
FIG.—4

ELECTRICAL POWER PROTECTION TECHNIQUE

BACKGROUND OF THE INVENTION

The present invention relates generally to electrical power protection techniques and more particularly to a safety mechanism for shielding high voltage live switch gear elements forming part of an overall switch gear assembly from the immediate area surrounding fuses utilized to electrically protect the assembly during repair and/or replacement of the fuses.

A typical switch gear assembly for use with three-phase high voltage is disposed within its own housing along with fuses, one for each phase, which serve to electrically protect the switch gear. While the fuses are also located within the same overall housing as the switch gear, they are spaced from the switch gear so that when there is a necessity for repairing or replacing one or more of the fuses, the danger of arcing from the high-voltage switch gear is reduced. Nevertheless, there is still a possibility of electrical arcing across the live switch gear and the area surrounding each fuse. This arcing could be hazardous to an operator repairing or removing a fuse.

In view of the foregoing, it is the primary object of the present invention to provide an uncomplicated and yet reliable way of ensuring that arcing does not occur between a live switch gear component or power terminal connecting that component to a fuse and the fuse when the latter is being repaired or replaced.

A more specific object of the present is to automatically physically shield the fuse to be repaired or replaced immediately after it is disconnected from the switch gear apparatus and before an operator can reach its immediate surroundings.

As will be described in more detail hereinafter, the objectives just recited are achieved by means of the electrical protection arrangement disclosed herein. That arrangement, which is especially suitable for use in high-voltage switch gear applications, includes an electrically insulated housing containing a fuse intended for placement in circuit with the switch gear and a source of high voltage. The housing has an entry door for gaining access to the fuse and also contains means therein for disengagably connecting the fuse to a terminal outside the housing through a utility opening in the housing. The terminal is connected in circuit with the source of high voltage and switch gear. In accordance with the present invention, means are provided (1) for automatically disconnecting the fuse from its terminal and thereafter closing the utility opening sufficient to physically shield the terminal from the fuse when the entry door is opened and (2) for automatically opening the utility opening and reconnecting the fuse with the terminal when the entry door is closed. In the case where the switch gear operates on three-phase voltage, such an arrangement would be provided for each phase.

BRIEF DESCRIPTION OF THE DRAWINGS

The overall arrangement will be described in more detail hereinafter in conjunction with the drawings wherein:

FIG. 4 is a view similar to FIG. 3 but illustrating the electrical power protection arrangement in a second operating condition.

DETAILED DESCRIPTION

Figure 1:
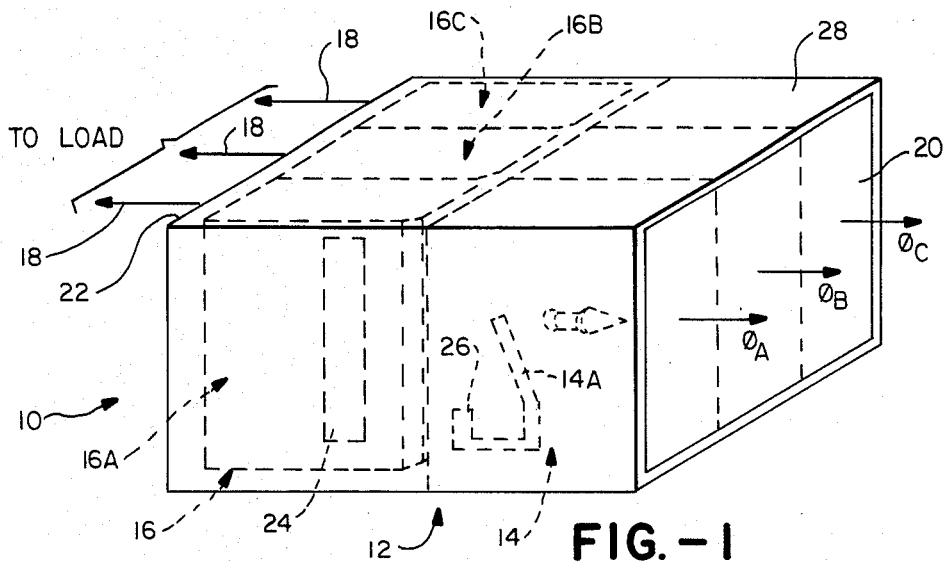
FIG. 1 diagrammatically illustrates, in perspective view, an overall switch gear apparatus and electrical power protection arrangement within one overall main housing and operating on three-phase high voltage.

Turning now to the drawings, wherein like components are designated by like reference numerals throughout the various figures, attention is first directed to FIG. 1. This figure illustrates an overall pad mount switch gear apparatus 10 which is especially suitable for distribution of, for example, 15,000 volts of three-phase electrical power. The apparatus includes an overall enclosure or main housing 12 containing a switch gear assembly 14 in one end section of the enclosure and containing an electrical power protection arrangement 16 in the other end section of the enclosure. The switch gear assembly includes three high-voltage switches respectively connected to the three phases ($\phi$) of the high voltage power which is diagrammatically illustrated by the three arrows designated phase ($\phi$) A, phase ($\phi$) B and phase ($\phi$) C. Only one of the three switches, switch 14A connected to phase ($\phi$) A, is illustrated. The electrical power protection arrangement 16 includes a fuse connected in series between each switch of the switch gear assembly and intended load, as diagrammatically represented by arrows 18. Access to the switch gear assembly is provided through an outer access door 20 on one end of enclosure 12 and access to the electrical power protection arrangement 16 is provided through an outer access door 22 at the other end of the enclosure.

As indicated immediately above, each switch making up overall switch gear assembly 14 is connected in series with its own fuse forming part of overall electrical power protection assembly 16. Thus, electrical power protection assembly 16 includes three switches. In fact, the overall electrical power protection assembly may be divided into three arrangements 16A, 16B and 16C, each of which includes one of the fuses. For purposes of clarity, only one of these electrical power protection arrangements, specifically arrangement 16A, will be described below. For the moment it suffices to say that the fuse forming part of this arrangement is designated by the reference numeral 24 and, as will be seen below, it is connected in series with switch 14A of switch gear assembly 14 through a power terminal 26.

Figure 2:
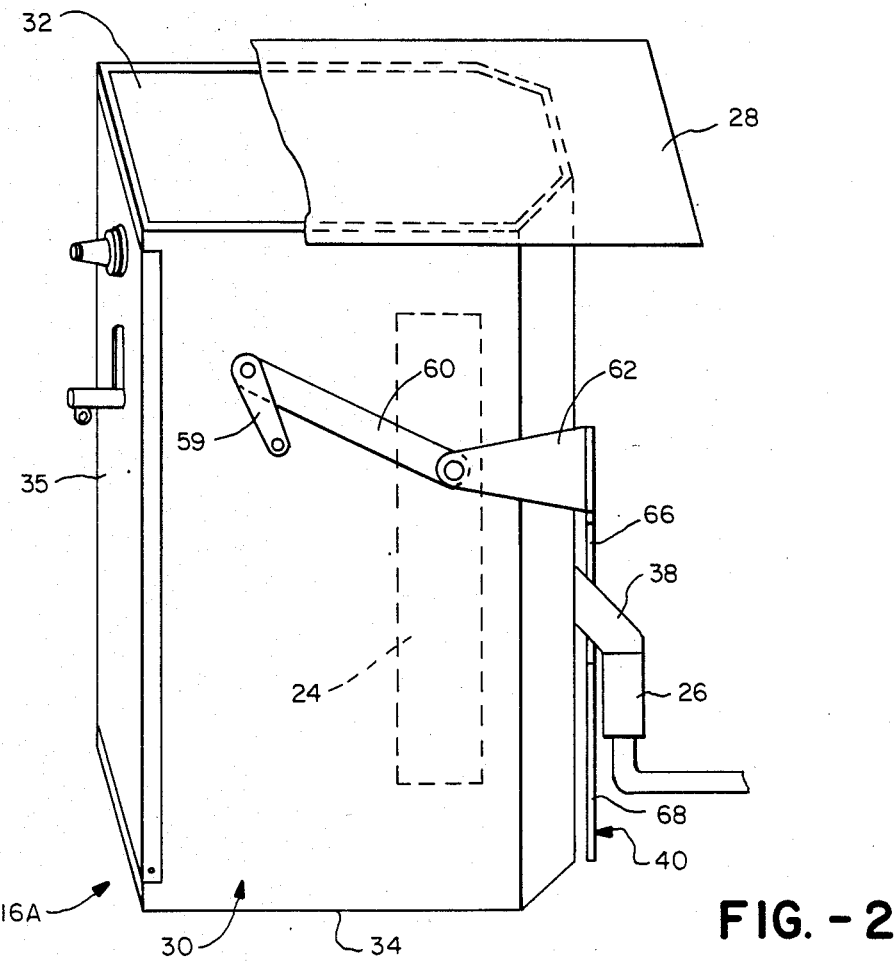
FIG. 2 is a diagrammatic illustration, in perspective view, of part of the electrical power protection assembly illustrated in FIG. 1, specifically an arrangement for protecting one phase of the three-phase circuit associated with the switch gear apparatus.

Turning to FIG. 2, attention is now directed specifically to electrical power protection arrangement 16A which is shown apart from enclosure 12, except for part of the enclosure's top side which is generally indicated at 28 in both FIGS. 1 and 2. Electrical power protection arrangement 16A includes it own electrically insulated housing 30 which may or may not be opened at its top and bottom ends 32 and 34, respectively. In an actual working embodiment, while these top and bottom ends are literally opened they are functionally closed by the top and bottom sides of enclosure 12 which are disposed in close proximity to the top and bottom ends of the housing, as exemplified by top side 28. Housing 30 which is constructed of, for example, electrical insulation material contains fuse 24 and includes a front entry door 35 for gaining access to the fuse from outside the housing. The fuse itself is disengagably connected to power terminal 26 located outside housing 30 through a utility opening 36 (see FIG. 3) in the housing by means of cooperating connector 38 extending through the utility opening.

In accordance with the present invention, as will be seen hereinafter in conjunction with FIGS. 3 and 4, overall electrical power protection arrangement 16A includes an electrically insulated shielding plate 40 disposed outside housing 30 in confronting relationship with utility opening 36. This plate and connector 38 are coupled to entry door 35, as will be seen, so that when the entry door is opened, it disconnects fuse 24 and connector 38 from terminal 26, causing the connector to move entirely within the housing, and thereafter immediately closes the utility opening 36 using shielding plate 40 to that end. As a result, there is no way that arcing can occur between the power terminal 26 and any components within housing 30, thereby ensuring the safety of an operator repairing or replacing fuse 24. Once the fuse is repaired or replaced, the door 35 can be closed which automatically opens the utility opening and reconnects fuse 24 with terminal 26 by means of connector 38, as will also be seen.

Overall arrangement 16 will now be described in detail in its fuse connected condition illustrated in FIG. 3. As seen there, connector 38 extends through utility opening 36 so that one end of the connector is physically and electrically connected to terminal 26 outside housing 30 and one end is connected to the bottom side of fuse 24 within the housing. The bottom side of the fuse is also physically connected to entry door 35 by means of an end cap 41 fixedly connected to the bottom side of the fuse and a connector insulator arm 42 fixedly connected at one end to the inside surface of the entry door near its bottom end. The otherwise free end of connecting arm 42 includes a coupling member 44 defining a slot 46 configured to receive a connecting pin 48 fixedly connected to end cap 41. The way in which end cap 41 and connecting pin 48 cooperate with connecting insulator arm 42 and coupling member 44 will be described hereinafter.

Figure 3:
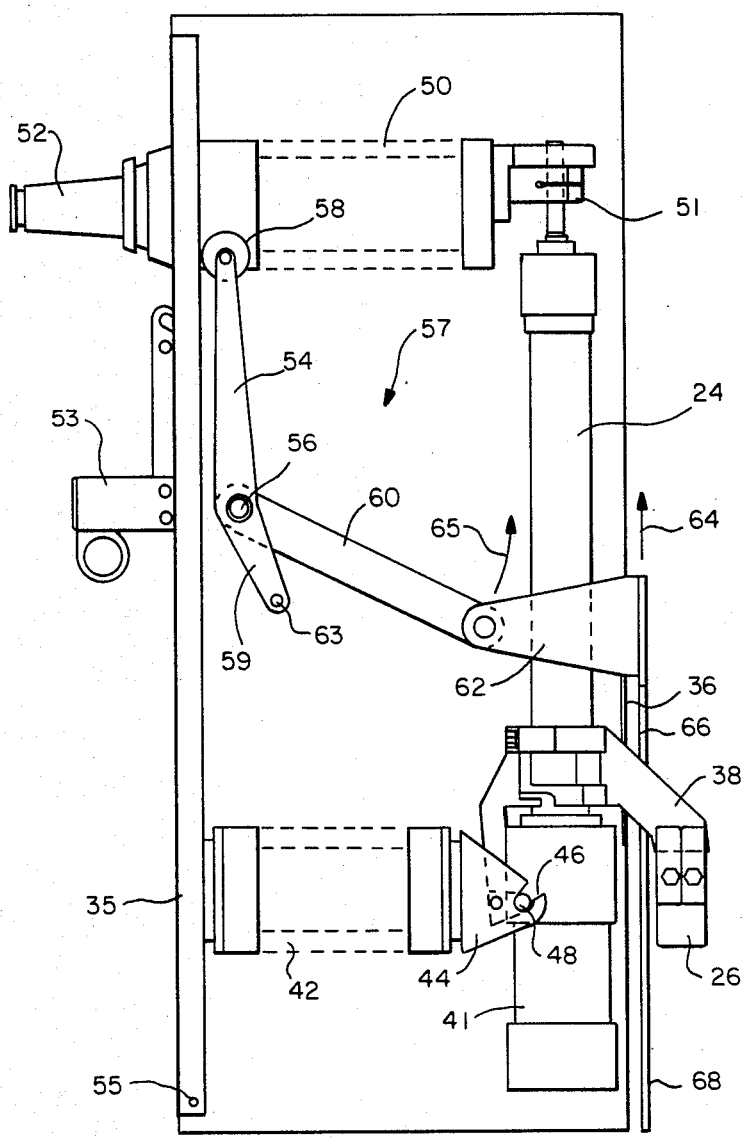
FIG. 3 is a diagrammatic illustration of the arrangement of FIG. 2, showing the arrangement in side elevational view and in a particular operating condition.

Still referring to FIG. 3, the top side of fuse 24 is physically connected to the inner side of entry door 35 near its top end by means of connecting insulator arm 50 through contact 51. The connecting arm also serves to electrically connect the top side of fuse 24 to a load terminal 52 located on the outer side of and carried by entry door 35 near its top end. While not shown in FIG. 3, terminal 52 is adapted for connection to a given load intended for connection in circuit with arrangement 16A.

Referring to FIG. 4, entry door 35 is shown partially opened. This is carried out by means of an insulated hook rod which may be manually attached to the latch handle 53 fixedly mounted to the front face of the entry door. As the door pivots counterclockwise about its pivotally mounted bottom end 55 from its closed position towards its opened position, the top end of fuse 24 remains connected in the contact 51 while connecting pin 48 remains within slot 46 of coupling member 44. At the same time, upper connecting insulator arm 50 and bottom connecting insulator arm 42 move counterclockwise about door end 55 with entry door 35, as shown in FIG. 4. This causes the entire fuse and connector 38 to move with the entry door about mounting end 55. This, in turn, causes connector 38 to disconnect from terminal 26 and move entirely within housing 30 through utility opening 36. As will be seen hereinafter, as this occurs, previously recited shielding plate 40 is automatically caused to close the utility opening.

Returning to FIG. 3, attention is now directed to a mechanism generally indicated by the reference numeral 57 for interconnecting or coupling shield plate 40 with entry door 35 for causing the shielding plate to open and close utility opening 36 in synchronism with the closing and opening of the entry door. As seen in FIG. 3, mechanism 57 includes an entry door follower arm 54 disposed within housing 30 and mounted for rotation about a horizontally extending shaft 56 disposed within housing 30. The shaft is mounted close to but spaced slightly from the inner surface of entryway door 35 when the latter is in its closed position. The free end of follower arm 54 carries a roller 58 which rests against the closed entryway door, as shown. As the door opens, as seen in FIG. 4, roller 58 moves with it, rolling down the inner surface of the entryway door as it does so. This can be provided by means of gravity or the follower arm could be spring loaded to pivot counterclockwise. In either case, the entry door follower will pivot about shaft 56 counterclockwise as the door is opened and clockwise as it is closed, causing the shaft 56 to do the same. Shaft 56 extends outside housing 30 and supports a secondary arm 59 which is fixedly connected to the shaft for rotation with it and arm 54. Thus, as entry door follower arm 54 rotates about shaft 56 in the counterclockwise direction as the entry door opens, the secondary arm also moves counterclockwise with it and when the arm 54 moves clockwise so does the secondary arm.

Still referring to mechanism 57, the latter is shown also including a link 60 pivotally mounted at one end around but not for rotation with shaft 56 outside housing 30 between the latter and secondary arm 59. The other end of link 60 is connected to one end of a flange 62 which is connected at its other end to the top of shield plate 40. Secondary arm 59 carries with it connecting pin 63 extending inward toward the housing and under link 60. As the entry door opens from its closed position, follower arm 54 moves counterclockwise, as illustrated in FIG. 4. This, in turn, causes secondary arm 59 to move counterclockwise so that pin 63 eventually engages the underside of link 60. As the door continues to open and the secondary arm continues to move counterclockwise it moves the link 60 up with it, as indicated by arrow 65. In actuality, the righthand end of the link, as viewed in FIGS. 3 and 4, pivots about shaft 56 and at the same time lifts flange 62 upward as indicated by arrow 64. In this regard, the link is pivotally connected to the flange so that the connected end pivots as it rises. This overall action, in turn, raises the shield plate 40 from its position illustrated in FIG. 3 upward with flange 62. While not shown in FIGS. 2 and 3, eventually the entryway door 35 can be fully opened to a substantially horizontally extending position, raising shield plate 40 to its uppermost extent.

In the foregoing description of mechanism 57, it has been shown that shield plate 40 moves between its lowermost FIG. 3 position when the entry door 35 is closed to a fully raised position when the entryway door is opened. As illustrated in FIG. 3, shield plate 40 includes an opened section 66 which is disposed directly in front of utility opening 36 when the plate is in its lowermost position. Note that the shield plate is located between the utility opening and power terminal 26. Note further that connector 38 extends not only through utility opening 36 but also through opening 66 in order to engage terminal 26.

As entryway door 35 opens, it causes fuse 24 and connector 38 to pivot counterclockwise about bottom end 55 of the door, as described previously. This disconnects connector 38 from terminal 26 and moves it entirely within the housing through openings 36 and 66. The secondary arm 59 is specifically positioned to engage link 60 in order to start lifting shield plate 40 during opening of the door at the point in time after connector 38 has cleared opening 66. As the entryway door continues to open and after connector 38 has moved inside housing 30, the shield plate moves upward. When it reaches its raised position, a solid section 68 of the shield plate is disposed directly in front of opening 36, thereby closing the utility opening with respect to terminal 26. The precise timing between movement of the shield plate 40 and entryway door 35 depends upon the angle of secondary arm 59 with respect to link 60. This angle can be set so that the shield plate moves upward and starts closing utility opening 36 as soon as the connector clears opening 66, thereby assuring that utility opening closes as soon as possible during the opening movement of entryway door 35.

Once the entryway door is opened and the utility opening is closed, an operator can safely repair or replace fuse 24. Moreover, entryway door 35 is manually disengagably connected to the rest of the housing so that it can be easily disconnected and removed from the rest of the arrangement. Indeed, an entirely new replacement door with a working fuse can replace a disconnected door. In this regard, note that the connecting mechanism 57 is not physically connected at all with the entryway door. Thus, it is only necessary to disengage the door at it pivot connecting end 55. Thus, once the door is reconnected or a new door takes its place, the latter can be closed. This causes the fuse 24 to pivot clockwise about terminal 52. At the same time mechanism 57 allows the shield plate 40 to move by its own weight downward until opening 66 is again located in front of utility opening 36 for the latter. At that time, the connector 38 moves through both openings and again engages terminal 26 as the entry door closes.

It is to be understood that each of the electrical power protection arrangements 16B and 16C be identical to the arrangement 16A. It is also to be understood that arrangement 16A is equally applicable for use with a single fuse utilized in a circuit arrangement requiring the safety it provides.

What is claimed is:

1. An electrical power protection arrangement especially suitable for high voltage applications, comprising:
   (A) an electrically insulated housing having a utility opening into its interior from outside the housing and a separate entry door mounted to the housing for movement between a closed position and an opened position;
   (b) fuse means disposed within said housing;
   (c) means adapted for connecting one side of said fuse means in electrical circuit with a load;
   (d) means for electrically connecting and disconnecting the opposite side of said fuse means to a source of power through a cooperating terminal disposed outside said housing, said connecting and disconnecting means being movable between
   (i) a first connecting position extending out through said utility opening from within said housing for electrically connecting said opposite side of said fuse means within the housing with said cooperating terminal outside the housing; and
   (ii) a second disconnecting position entirely within said housing for electrically disconnecting said opposite side of said fuse means from said terminal; and
   (e) first and second means for coupling the entry door of said housing with said connecting and disconnecting means such that
   (i) opening the entry door causes said first coupling means to automatically move the connecting and disconnecting means to its disconnecting position while said second coupling means closes said utility opening whereby to disconnect the fuse means and physically shield it from said terminal; and
   (ii) closing the entry door causes said second coupling means to automatically opens the utility opening while said first coupling means moves said connecting and disconnecting means to its connecting position through said opening.

2. An arrangement according to claim 1 wherein said second coupling means includes an electrically insulated shielding plate and linking means coupled with said entry door such that the shielding plate is movable in a predetermined way between
   (a) a first position directly over said utility opening for closing the latter immediately after said entry door is opened and the connecting and disconnecting means is moved to its disconnected position within said housing; and
   (b) a second position to one side of said utility opening for opening the latter when entry door is opened.

3. An arrangement according to claim 2 wherein said housing includes a front face containing said entry door, an opposite back wall including said utility opening and spaced side walls connecting said front face with said back wall.

4. An arrangement according to claim 3 wherein said shielding plate is disposed outside said housing in confronting relationship with and movable along the back wall of the housing between its first and second positions for closing and opening the utility opening, respectively.

5. An arrangement according to claim 4 wherein said linking means includes an assembly of links disposed partially with and partially outside said housing for moving said shielding plate in said predetermined way.

6. An arrangement according to claim 5 wherein said assembly of links includes a link which can be adjusted to vary the timings between opening and closing said entry door and closing and opening the utility openings.

7. An arrangement according to claim 1 wherein said housing and said first and second coupling means are configured such that said entry door and said fuse means are disengageably removable from the housing, by hand, in order to repair or replace the fuse means.

8. An electrical power protection arrangement especially suited for use in high voltage switch gear apparatus, said arrangement comprising:
   (a) an electrically insulated housing containing a fuse intended for placement in circuit with said switch gear and a source of high voltage and having an entry door for gaining access to said fuse from outside the housing;
(b) first means for disengageably connecting said fuse to a terminal outside said housing through a utility opening in the housing, said terminal being connected in circuit with said source of high voltage and said switch gear;
(c) second means for opening and closing said utility opening; and
(d) third and fourth means coupling said entry door with said first and second means, respectively, such that said third means automatically disconnects said fuse from said terminal while said fourth means closes said utility opening sufficient to physically shield and terminal from said fuse when said entry door is opened, and said fourth means automatically opening said utility opening and aid third means reconnecting said fuse with said terminal when said entry door is closed.

9. An arrangement according to claim 8 wherein said high voltage has three phases and wherein said arrangement includes three of said housings, each containing a fuse and associated first, second, third, and fourth means.

10. A method of providing protection in an electrical power circuit in which a fuse is utilized in circuit with a source of high voltage in order to provide the desired protection, the improvement comprising:
(a) containing said fuse within an electrically insulated housing having an entry door for gaining access to the fuse from outside the housing;
(b) disengagably connecting said fuse to a terminal outside the housing through a utility opening in the latter, said terminal being connected in circuit with said source of high voltage;
(c) automatically disconnecting said fuse from said terminal and thereafter closing said utility opening sufficient to physically shield said terminal from said fuse when said entry door is opened from a closed position in order to gain access to said fuse; and
(d) automatically opening said utility opening and reconnecting said fuse with said terminal when said entry door is closed from its opened position.

11. The method of electrically protecting a switch gear apparatus operating on three-phase high voltage, said method including utilization of three fuses, one for each of said three phases, each fuse being placed in series with a cooperating switch forming part of said switch gear, the improvement comprising:
(a) containing each of said fuses in its own electrically insulated housing having its entry door for gaining access to that fuse from outside the housing;
(b) disengageably connecting each fuse to its own cooperating power terminal, which is located outside the housing, through its own utility opening in the housing;
(c) automatically disconnecting each fuse from its power terminal and thereafter closing its cooperating utility opening sufficient to physically shield that terminal from the fuse when the entry door is opened from a closed position; and
(d) automatically opening each utility opening and reconnecting its associated fuse with its cooperating power terminal when the entry door of its housing is closed from an opening position.

* * * * *